United States Patent [19]

Kornylak

[11] Patent Number: 4,681,203
[45] Date of Patent: Jul. 21, 1987

[54] MULTI-TRACK GRAVITY CONVEYOR

[75] Inventor: Andrew T. Kornylak, Hamilton, Ohio

[73] Assignee: Omniquest, Inc., Hamilton, Ohio

[21] Appl. No.: 800,973

[22] Filed: Nov. 22, 1985

[51] Int. Cl.[4] .............................................. B65G 13/00
[52] U.S. Cl. ................................................. 193/35 R
[58] Field of Search ................. 193/35 R, 35 A, 35 C,
193/35 J, 35 G, 35 S, 35 F, 37; 211/151;
198/721, 780

[56] References Cited

U.S. PATENT DOCUMENTS

| | | |
|---|---|---|
| 895,621 | 8/1908 | Fawell . |
| 1,455,977 | 5/1923 | Wentz ............................... 193/35 R |
| 1,541,410 | 6/1925 | Cowley . |
| 2,914,811 | 12/1959 | Cole et al. . |
| 2,920,734 | 1/1960 | Heinrich ............................ 193/35 F |
| 2,983,352 | 5/1961 | De Flora et al. . |
| 3,053,368 | 9/1962 | Klahn . |
| 3,252,556 | 5/1966 | Isacsson . |
| 3,275,124 | 9/1966 | Lutes et al. . |
| 3,374,877 | 3/1968 | Kornylak . |
| 3,374,878 | 3/1968 | Kornylak . |
| 3,420,348 | 1/1969 | Caudell et al. ................... 193/35 R |
| 3,443,674 | 5/1969 | Kornylak . |
| 3,509,978 | 5/1970 | Bedford . |
| 3,586,142 | 6/1971 | Inwood et al. . |
| 3,621,960 | 11/1971 | Kornylak . |
| 3,651,911 | 3/1972 | Kornylak . |
| 3,721,326 | 3/1973 | Bussienne ......................... 193/35 R |
| 3,768,614 | 10/1973 | Tabler . |
| 3,857,473 | 12/1974 | Kornylak . |
| 3,900,112 | 8/1975 | Azzi et al. ......................... 193/35 R |
| 4,006,810 | 2/1977 | Kornylak . |
| 4,023,672 | 5/1977 | Haley . |
| 4,067,428 | 1/1978 | Shuttleworth . |
| 4,205,740 | 6/1980 | Hammond . |
| 4,311,226 | 1/1982 | Thompson et al. . |
| 4,379,503 | 4/1983 | Kornylak . |

FOREIGN PATENT DOCUMENTS 1099549  1/1968  United Kingdom ............. 193/35 R Primary Examiner—Jeffrey V. Nase
Attorney, Agent, or Firm—Fay, Sharpe, Beall Fagan, Minnich & McKee

[57] ABSTRACT

An undriven gravity roller conveyor is disclosed in which a plurality of discrete, elongate channel members are attached in a spaced apart, parallel relation to a base structure. The separation between neighboring channel members is made equal to the separation between the opposite side walls of each channel member, thereby providing a plurality of rows extending between the side walls of the channel members. Open slots equidistantly spaced apart are formed along the upper edges of each side wall. The slots are aligned in parallel columns substantially perpendicular to the length of the rows. Load-bearing rollers mounted upon axles are arranged in rows both between the opposite side walls in each channel member and between adjacent side walls of neighboring pairs of channel members, with the axles of the rollers held within the slots. The spacing between slots is substantially less than one-half of the exterior diameter of the rollers.

60 Claims, 15 Drawing Figures

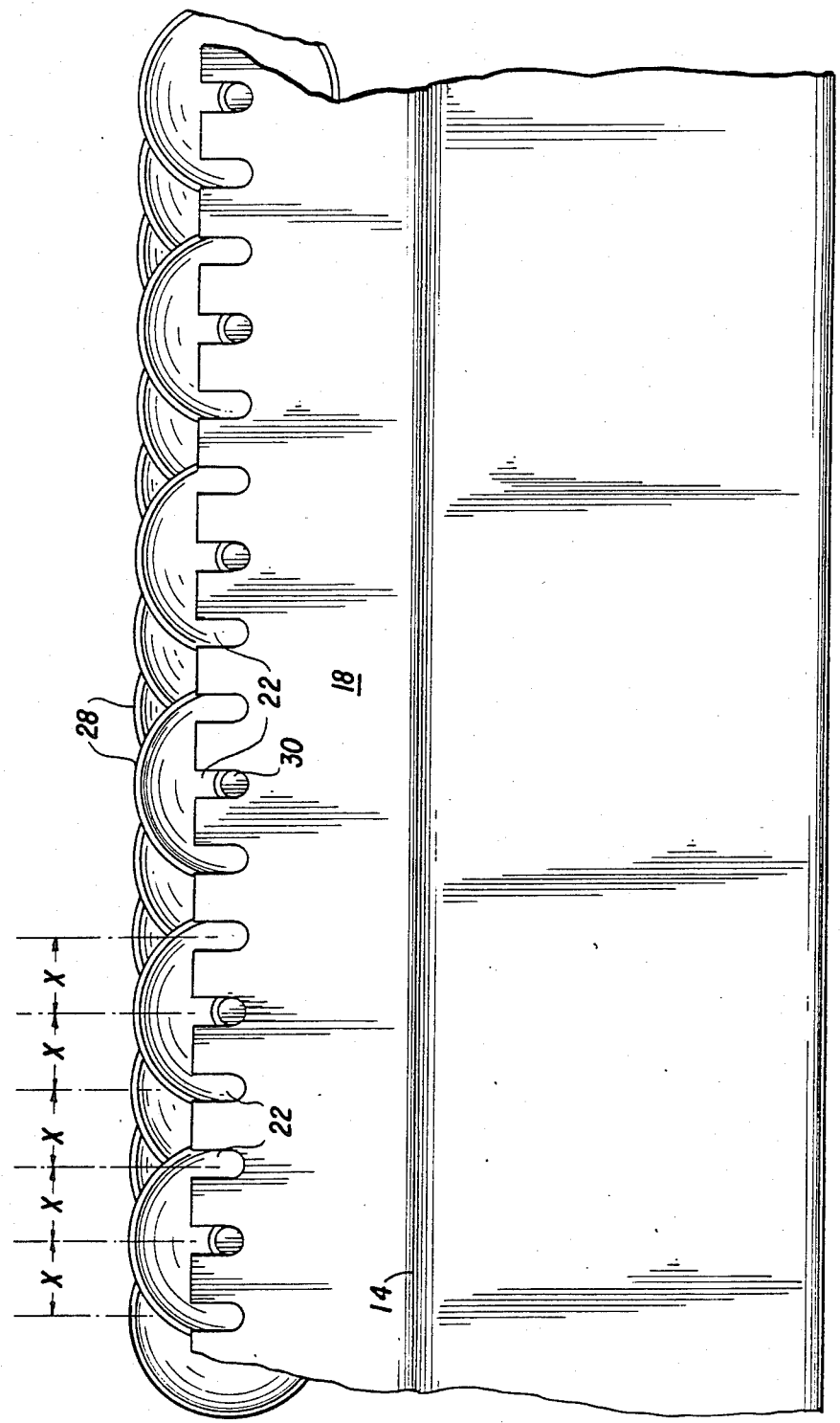

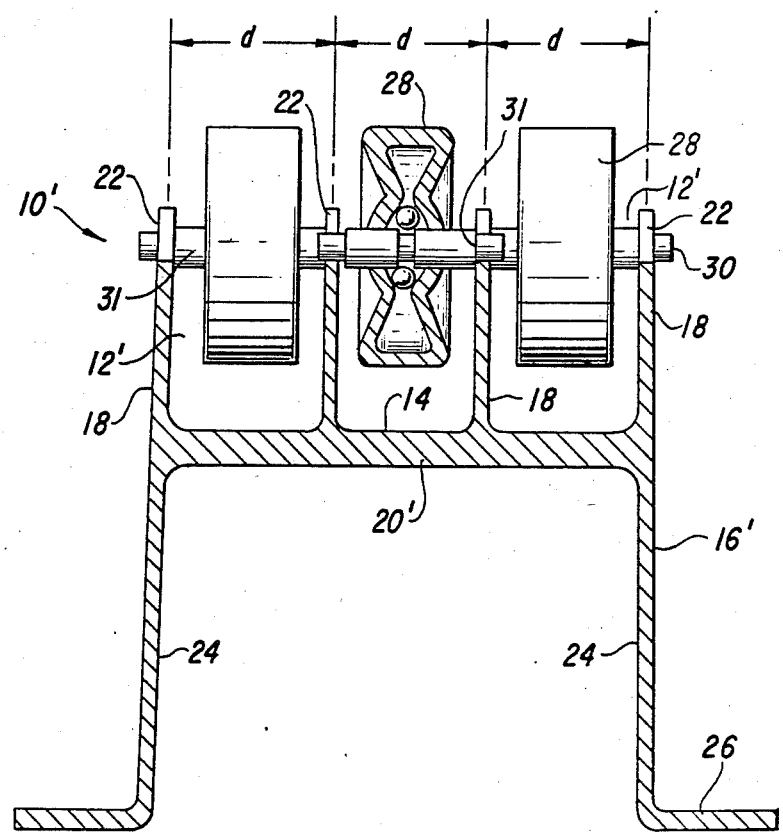

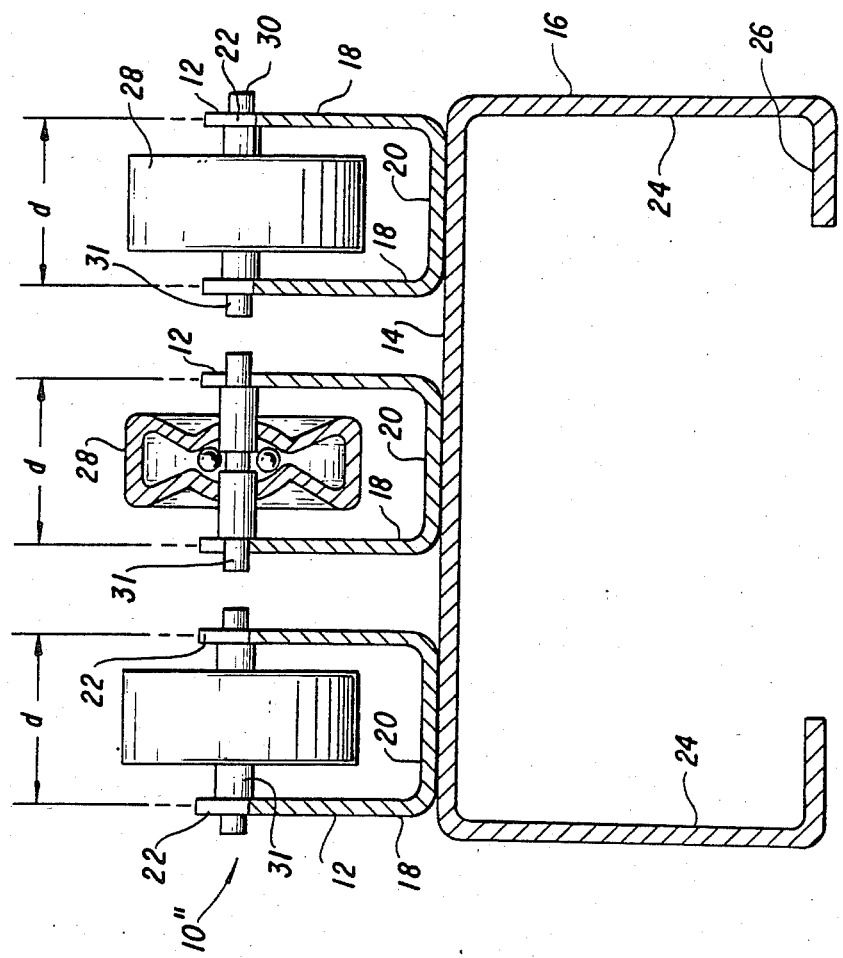

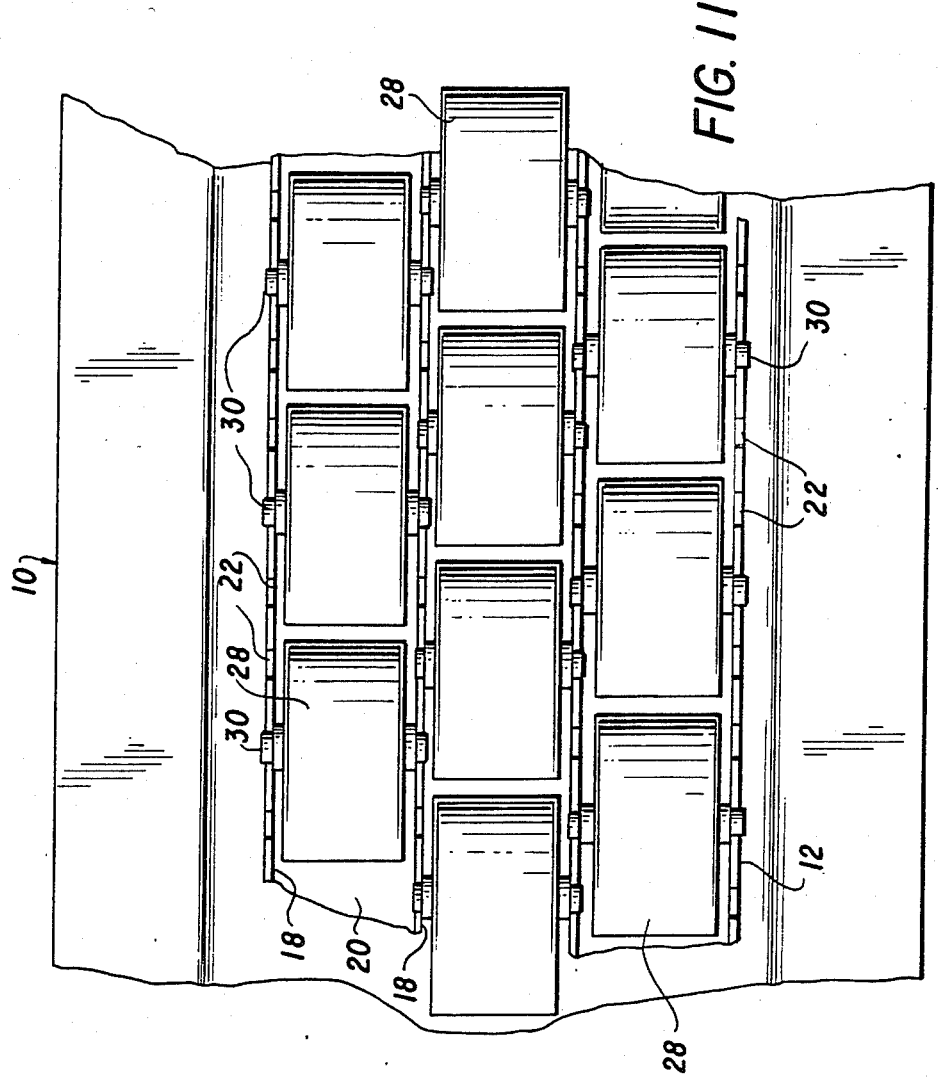

MULTI-TRACK GRAVITY CONVEYOR

TECHNICAL FIELD

This invention relates to gravity-type roller conveyors and, more particularly, to multiple-track conveyors and to the rollers for such conveyors.

BACKGROUND ART

Currently available gravity roller conveyors typically use a pair of structural members to support each row of load-bearing rollers. Such a structure necessitates tedious fabrication techniques to assure uniform spacing between all of the structural members throughout the length of the conveyor. It is often desirable in such systems to stagger the placement of successive rollers to reduce the gap over which a load is unsupported. Typically, the staggering is achieved merely by adding one or more additional rows of rollers with their centers longitudinally offset from one another. Recent conveyor designs have incorporated rollers mounted on alternate sides between pairs of support structures; however, the need to accommodate the axles of successive rollers has restricted the ability of such designs to minimize the gap between successive rollers. To date, the only conveyor systems providing minimal gap between successive rollers require an excessive number of structural supporting members. Such designs exacerbate the fabrication difficulties of maintaining proper spacing between the structural supporting members.

To avoid the use of ballbearing type journals between the axles of conveyor rollers and the structural supporting members, some designs have used specially machined configurations of axles for retentively engaging apertures in the structural support members with various types of flanges, bushings and retainers. Other designs have used sleeve-type ball bearing assemblies interposed between the axles of the rollers and specially formed receptacles in the supporting structural members. Unique axles and specially formed receptacles both incur additional tooling and fabrication costs. Moreover, the often intricate interrelation between the specially formed receptacles and the unique axles or bearings tends to hinder the repair or replacement of damaged rollers, thereby unnecessarily contributing toward the maintenance cost of such conveyor systems.

STATEMENT OF INVENTION

Accordingly, it is one object of this invention to provide an improved conveyor for the movement of cargo.

It is another object to provide a conveyor having a minimal number of structural members.

It is still another object to provide a conveyor which costs less to fabricate.

It is yet another object to provide a conveyor which may be easily fabricated to precise tolerances.

It is still yet another object to provide a conveyor which is amenable to rapid replacement of its load-bearing rollers.

It is a further object to provide a conveyor in which the load-bearing rollers may be easily interchanged.

It is a still further object to provide a conveyor in which the spacing patterns between load-bearing rollers may be easily modified.

It is a still yet further object to provide a conveyor exhibiting a very close spacing between load-bearing rollers.

It is an additional object to provide a conveyor able to accommodate the movement of cargo borne in containers which have supporting surfaces of narrow width engaging the load-bearing rollers of the conveyor.

It is also an object to provide a conveyor having inexpensive load-bearing rollers exhibiting low friction characteristics.

These and other objects are achieved with an undriven gravity roller conveyor in which a plurality of discrete, elongate channel members are laterally spaced apart, in parallel on a base structure to form a plurality of rows. The separation between the side walls of neighboring channel members is equal to the separation between the opposite side walls of each of the channel members. Uniform open slots are formed along the distal edges of the parallel side walls of each channel member with equidistant spacing between successive slots along each edge. Corresponding slots in adjacent side walls are aligned to form parallel columns that are substantially perpendicular to the length of the rows. Rollers mounted on axles are positioned between the side walls with the axles being disposed within the slots.

Alternatively such features as the depths, widths or spacings between successive slots may be varied, either separately or in combination, along the length of the channel members to accept different sizes or arrangements of rollers at specific locations and thereby accommodate variations in cargo loading experienced at those locations.

BRIEF DESCRIPTION OF THE DRAWINGS

A more complete appreciation of this invention and many of the attendant advantages thereof will be readily apparent as the same becomes better understood by reference to the following detailed description in which like numbers indicate the same or similar components, and wherein:

FIGS. 3A and 3B are is a side cross-sectional views taken along lines IIIA—IIIA' and IIIB—IIIB' in FIG. 2;

FIGS. 6A and 6B are front and end views of a sleeve usable in the roller assembly shown in FIG. 5 while

FIG. 9 is an end cross-sectional view of an alternative embodiment;

FIG. 10 is an end cross-sectional view of an embodiment according to some of the principles disclosed;

FIG. 11 is a top view of an alternate embodiment of a conveyor of the type shown in FIG. 1.

DETAILED DESCRIPTION OF THE INVENTION

Figure 1:
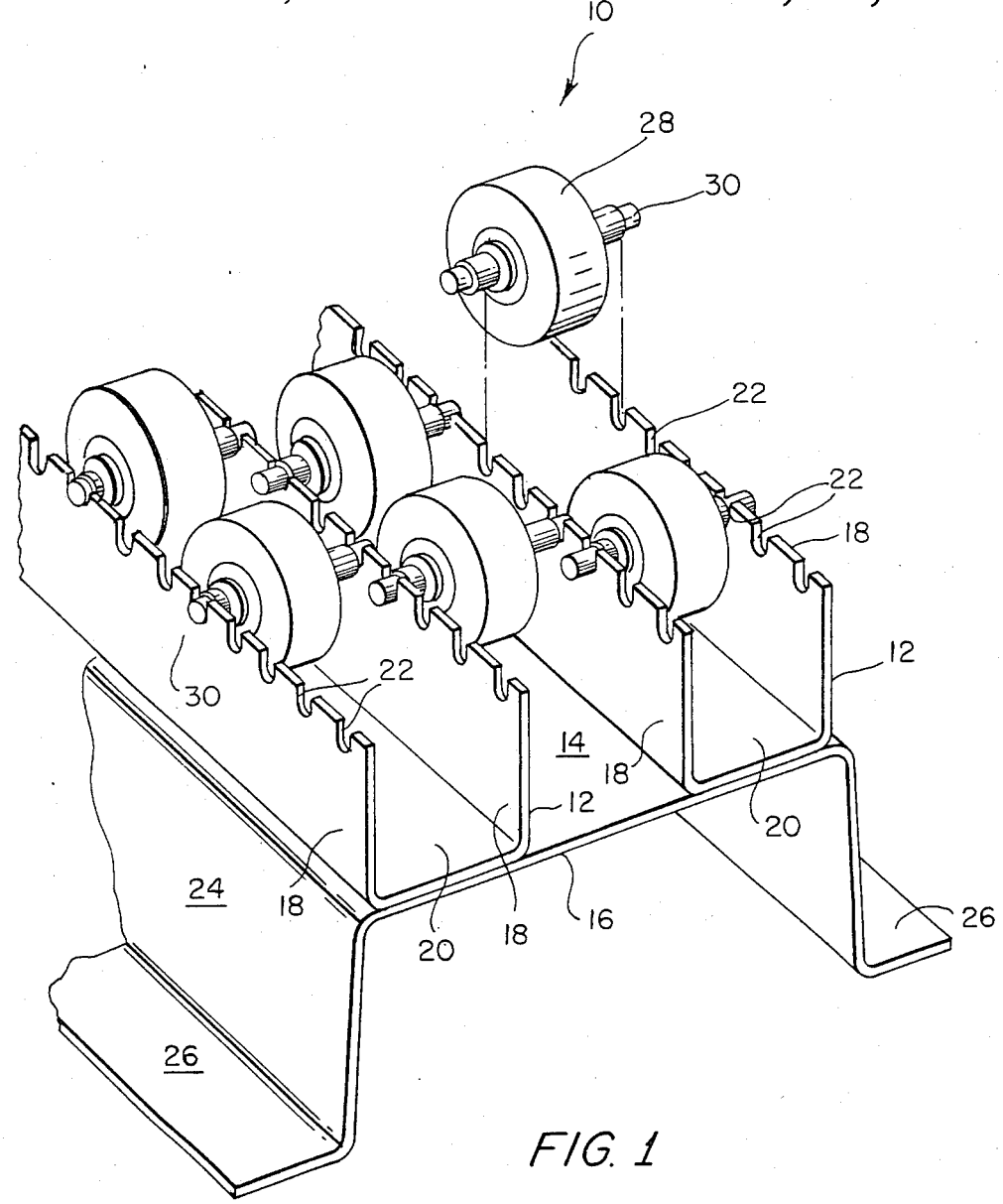
FIG. 1 is an isometric view of an embodiment of an undriven gravity roller conveyor according to the principles of the present invention.

According to the principles of the present invention, FIG. 1 shows a section of a multi-track undriven gravity-type conveyor 10 which is constructed with a pair of elongate channel members 12 of any desired length affixed in a spaced apart, parallel relation to the outer surface of a web 14 of a base structure 16. Each channel member 12 has a pair of opposite side walls 18 extending in parallel along the length of section 10. Connecting sides 20 rigidly join and maintain opposite side walls 18 in the fixed, spaced apart relation.

A plurality of open slots 22 are formed along the unjoined upper edges of each side wall 18. The slots 22 are substantially identical and equidistantly spaced along the upper or unjoined edges of side walls 18. Slots 22 are aligned in parallel columns which are substantially perpendicular to the length of multi-track section 10.

Base structure 16 can itself be constructed as a channel or C-shape with a pair of substantially parallel flange walls 24 disposed along opposite sides of web 14 and extending downwardly away from connecting sides 20 of channel members 12. The lowermost ends of flange walls 24 are bent at right angles to the surfaces of flange walls 24 to provide a pair of feet 26. The disposition of flange walls 24 and feet 26 extending in an opposite direction from side walls 18 endows multi-track section 10 with enhanced rigidity, thereby enabling a conveyor in which section 10 is incorporated to handle heavier cargo loads without resorting to the use of channel members 12 having stronger material characteristics.

A plurality of rollers 28 having opposite end portions of their axles 30 extending from opposite sides, are disposed in rows both between opposite side walls 18 of each channel member 12 and between adjacent side walls 18 of each pair of neighboring channel members 12. The end portions of axles 30 are disposed within aligned pairs of slots 22, thereby forming three rows of staggered rollers 28, with each row extending over substantially the entire length of multi-track section 10. In this manner, it can be seen that two discrete channel members 12, when spaced apart so that the least distance between their closest side walls 18 is equal to the spacing between opposite side walls 18 of each channel member, provide three adjacent rows of unconnected rollers for independently supporting a cargo load such as a slat of a pallet.

Figure 2:
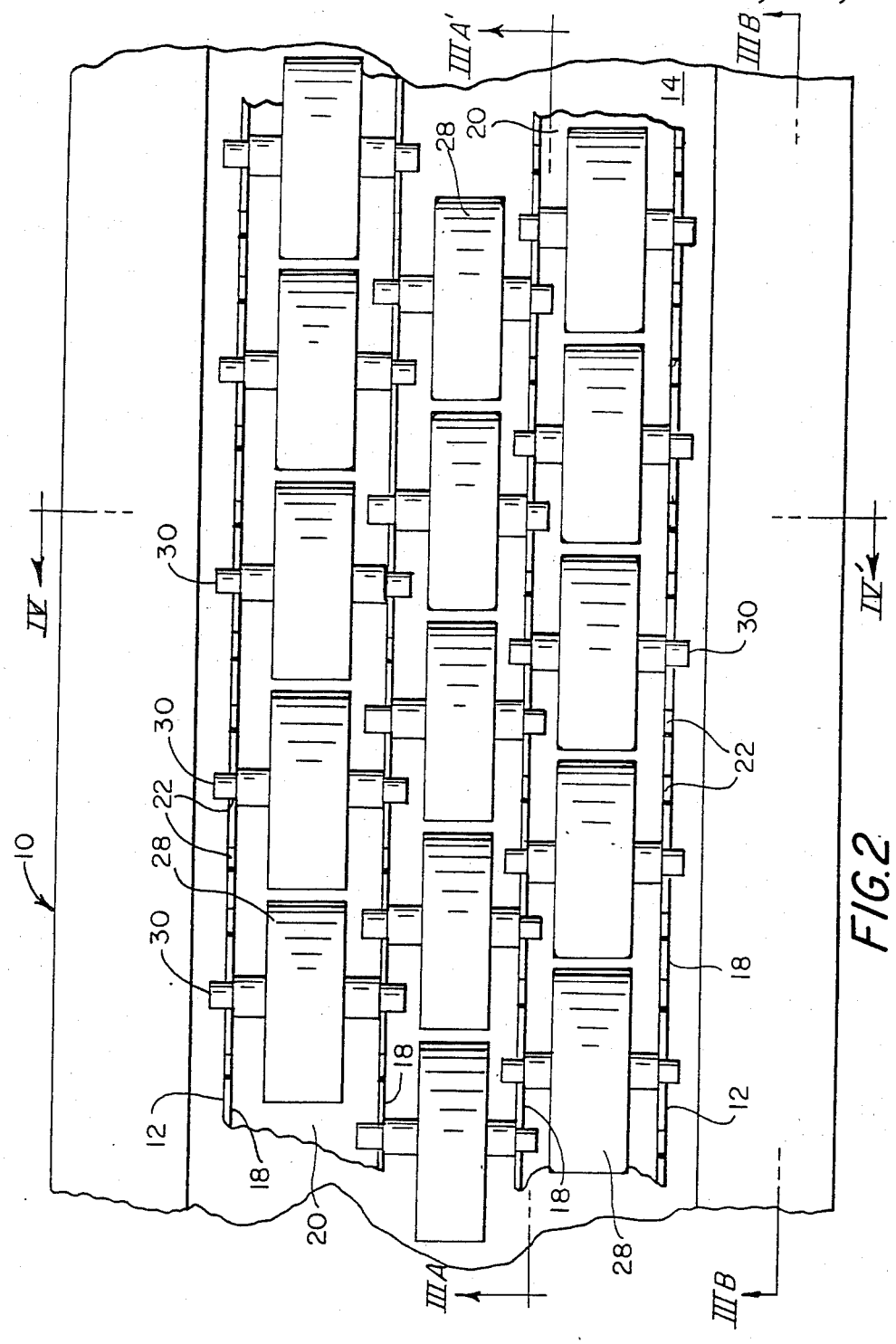
FIG. 2 is a top view of a conveyor of the type shown in FIG. 1.

As shown in FIG. 2, this arrangement of channel members 12 having a plurality of substantially identical slots 22 aligned in columns perpendicular to the length of section 10, provides a configuration in which the end portions of axles 30 are disposed within every third pair of slots along each row formed by side walls 18. This arrangement allows the spacing between rollers in each row to be independently determined and tailored to a particular conveyor application. It may be seen therefore, that three discrete, spaced apart channel members 12 will provide five rows of load-bearing rollers 28 while four discrete, spaced apart channel members 12 will provide seven rows of rollers 28. In general, n discrete channel members 12 arranged in parallel with the separation between the side walls of neighboring channel members being equal to the separation between the opposite side walls of each channel member, and with corresponding slots 22, in at least closest of the opposite side walls of neighboring channel members 12, aligned in parallel columns substantially perpendicular to the length of the rows, provide $2n-1$ rows for the placement of load-bearing rollers 28.

Figure 3A:
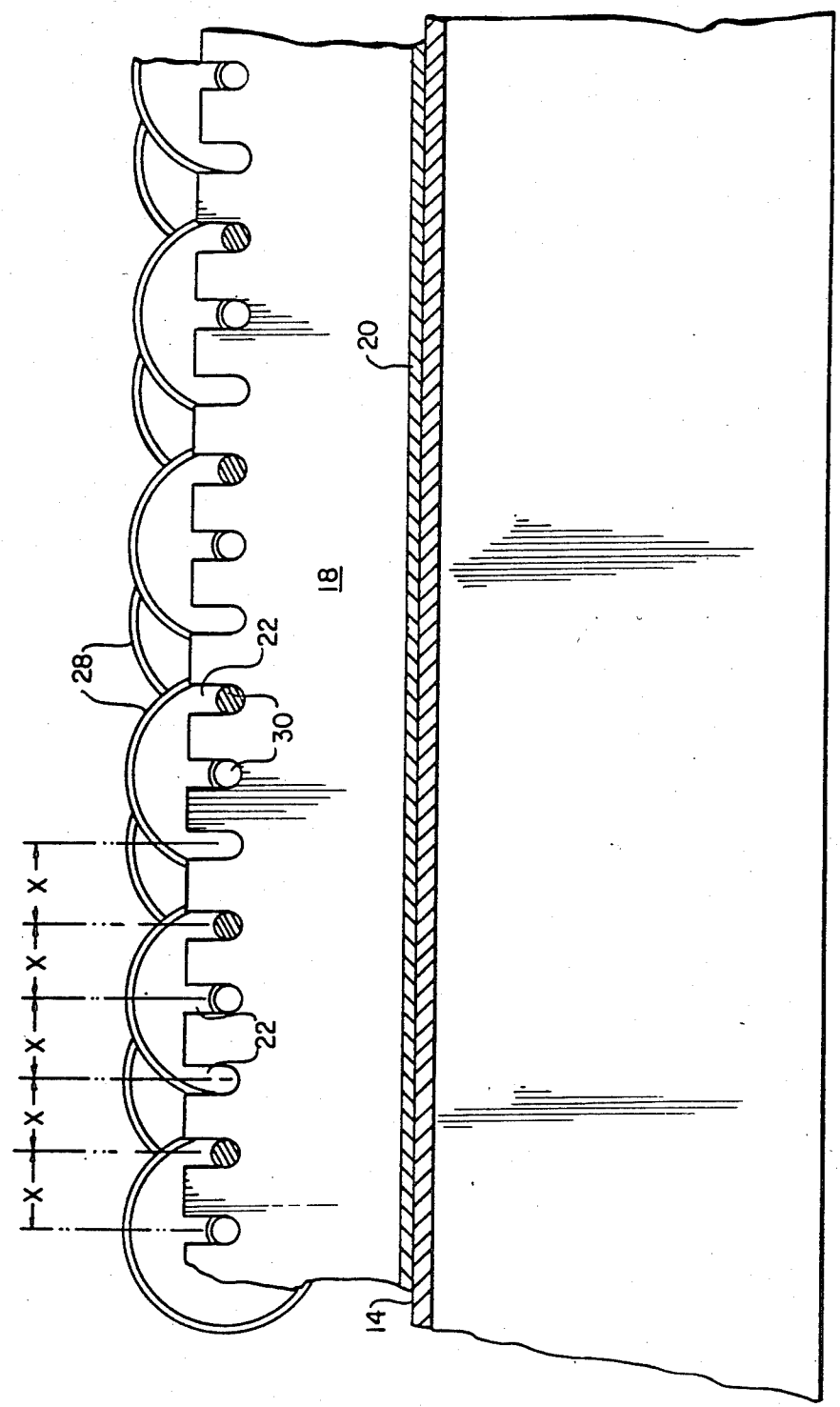

The spacing between slots 22 is best shown in FIGS. 3A and 3B side cross-sectional views taken along lines IIIA—IIIA' and IIIB—IIIB' in FIG. 2. As shown, the end portions of axles 30 in a row of rollers 28 are disposed within every third slot along the length of the row. In this arrangement, the center-to-center spacing x between successive slots 22 along each unjoined edge of side walls 18 can be made extremely small. As shown, the center-to-center spacing x is substantially less than one-half the exterior diameter of a roller 28. Practical considerations such as the occasional presence of trash or debris upon a section 10 during operation of a conveyor dictates that a small clearance be maintained between each successive pair of rollers in each row. In effect therefore, the multi-track configuration disclosed provides a spacing between successive slots 22 which is substantially equal to the quotient of the sum of the exterior diameter of one of the rollers and the clearance between two successive rollers in the row, divided by the number of rows $2n-1$.

In a typical configuration, with two channel members, using commercially available standard ball bearing skate wheels having nominal two inch exterior diameters, with the skate wheels mounted to provide approximately 1/32 of an inch clearance between successive skate wheels, the sum of the exterior diameter of one skate wheel type roller and the clearance between two successive skate wheel rollers will equal two inches. This will allow for a 0.675 inch center-to-center spacing between successive slots. Alternatively, a 0.8 inch spacing between successive slots will accommodate 2.25 inch diameter rollers such as the Palletflo hysteresis wheels. It may be seen therefore, that this configuration accommodates a spacing between slots which nearly approaches one-third of the exterior diameter of the rollers. The practical advantages of the close spacing provided between successive slots lie in both the ease with which a roller spacing pattern can be changed and in the ability of a conveyor with close spacing between successive rollers to accommodate, due to the staggered alignment of neighboring rows, movement without tipping, of cargo borne in containers having load-bearing members of narrow width engaging the rollers.

Figure 4:
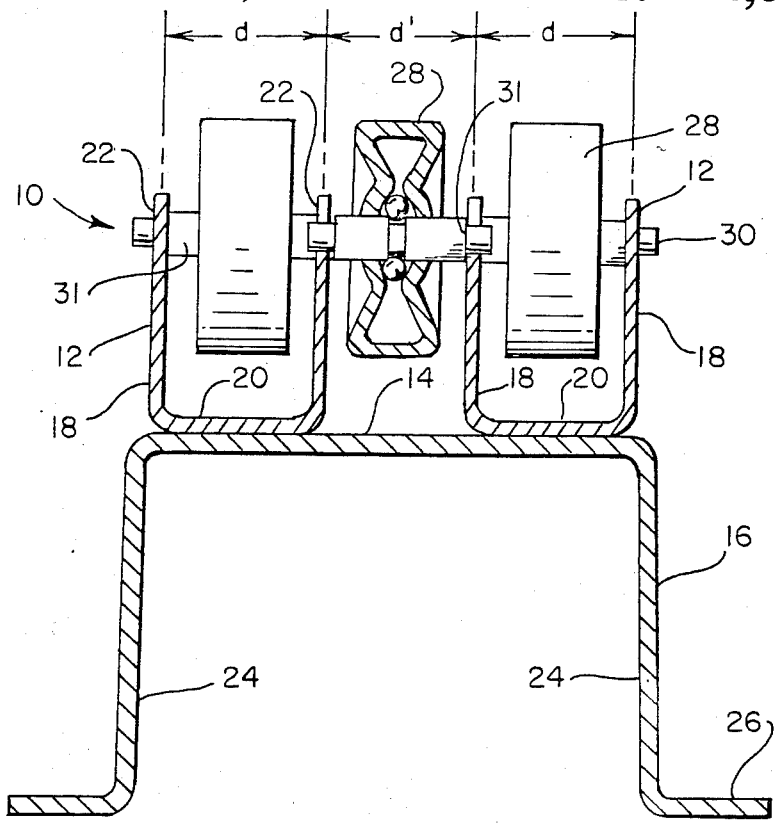
FIG. 4 is an end cross-sectional view taken along line IV—IV' in FIG. 2.

FIG. 4 provides a cross-sectional end view taken along line IV—IV' in FIG. 2 to show the detailed structural aspects of section 10. The pair of channel members 12 shown provide four side walls 18 accommodating three parallel rows of rollers 28. As shown, connecting sides 20 rigidly join and maintain opposite side walls 18 in their fixed, spaced-apart relation. The separation, d' between side walls 18 of neighboring channel members 12 is equal to the separation, d, between opposite side walls 28 of both channel members 12. The rollers shown may be conventional versions of standard ballbearing skate wheels with axle 30 pressed through the center of the wheel assembly. The shoulders 31 formed in axles 30, inwardly from their end portions, rest against the facing surface of side walls 28. Alternatively, these standard skate wheel rollers may be replaced with a type having a solid inner race with projecting journals.

Figure 5:
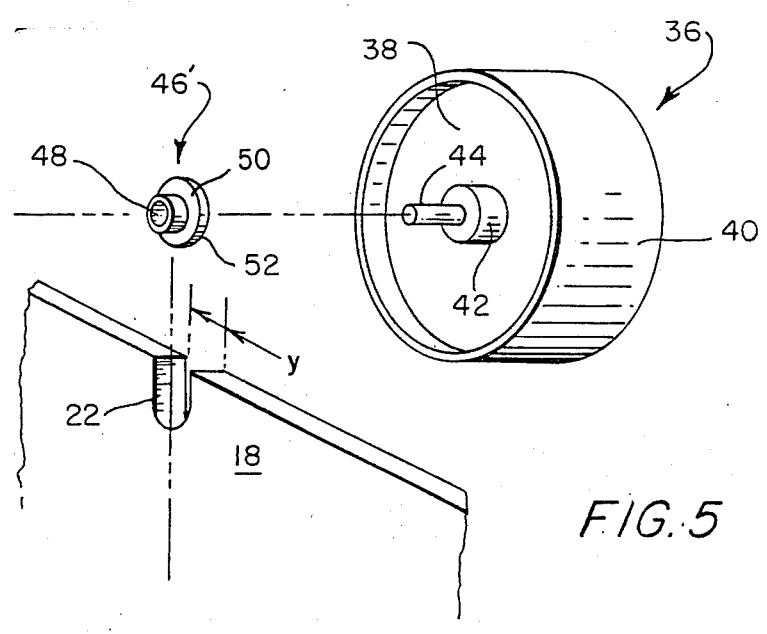
FIG. 5 is an exploded isometric view showing one type of wheel assembly usable with the conveyor shown in FIG. 1.

FIG. 5 shows an alternative embodiment of the roller 36 of less expensive construction. Roller 36 has a circumferential load-carrying surface provided by an element such as a circumferential flange 40 which encircles the disc and forms a load-bearing surface. An axle retaining center such as a hub 42 is formed at the center of the roller, coaxially disposed with respect to the load-carrying surface. A rigid element such as a central disc 38 formed as an integral part of the roller construction or, alternatively, an intermediate portion made of a rigid solid or cellular material, connects the axle retaining center with the element providing the load-carrying surface. It may be noted that central disc 38 forms a web and may have either a flat or a corrugated cross-sectional shape (and the corrugations may be either radial or unidirectionally oriented). The ends of an axle 44 extend from and axially beyond hub 42. These rollers may be made of any number of inexpensive materials such as ABS plastic, nylon or polypropylene while axle 44 is generally made of steel. Axle 44 may be molded in place or alternatively, press fit into an axial passage formed through hub 42 during molding. It should be noted that a mold for roller 36 may be fitted with interchangeable core elements to provide different diameters of axial passages through hub 42 during molding. This would allow rollers 36 to be fitted with different diameter axles 44. A larger diameter axle may be used to provide heavy-duty wheels suitable for use at particular locations (e.g., pallet loading zones) along the conveyor while smaller diameter axles may be used in wheels where low friction properties are desired (in substitution of more expensive ball bearing type rollers). The load-bearing surface of flange 40 may be either provided by or, alternatively encircled with, an elastomeric material forming, for example, a tire.

Figure 6A:
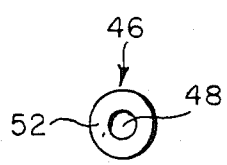
Figure 6B:
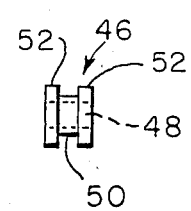
Figure 6C:
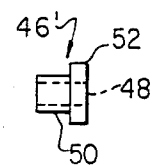
FIG. 6C is an end view of the sleeve shown in the roller assembly of FIG. 5.

Sleeves 46' having an aperture 48 extending axially therethrough are placed around both ends of axles 44 to accommodate rotation of rollers 36. As shown in FIGS. 6A, 6B and 6C, sleeves 46, 46' have a tubular portion 50 of lesser diameter and either a single (FIG. 6C) or a pair of flanges (FIGS. 6A and 6B) 52 of greater diameter projecting from portion 50. The tubular portion 50 is configured to allow sleeve 46, 46' to be received within slot 22, and thereby serve as a sleeve bushing providing a low friction accommodation for rotation of shaft 44 and roller 36. In one embodiment, the diameter of central portion 50 is greater than the width, y (shown in FIG. 5), of the slots. Consequently, when central portion 50 of sleeve 46, 46' is forced into slot 22, the central portion is slightly deformed, thereby assuring that sleeve 46, 46' will remain within slot 22 during shipment of section 10 and its subsequent use to convey moving cargo. It should be noted that sleeves 46' having only a single flange 52 are cheaper to mold than sleeves with a pair of flanges. In embodiments using sleeves with a single flange 52, the flanges (on the two sleeves used on opposite ends of each axle) are located inside the channel, between hub 42 and the inside surfaces of side walls 18.

In the same embodiment of roller 36, or in an alternative embodiment, the cross-sectional dimension (e.g., the diameter) of axial bores 48 may be made greater than the diameter of the corresponding axle 44. Consequently, when the diameter of central portion 50 is made slightly larger than the width of the slot, a press or interference fit of sleeve 46, 46' into a slot not only assures that the sleeve is held in place, but that axial bore 48 has a cross-sectional dimension greater than the diameter of axle 44. This assures that the cross-sectional dimension of deformed axial bore 48 is greater than the diameter of shaft 44, thereby providing a correct, low-friction fit for axle 44. It should be noted that the innermost flange 52 of each sleeve should have an axial thickness sufficient to serve as a spacer between the corresponding base surface of hub 42 and the facing surface of side wall 18 surrounding slot 22. Proper selection of the thickness of flange 52 will prevent axe 44 and roller 36 from experiencing axial movement between side walls 18.

Figure 7:
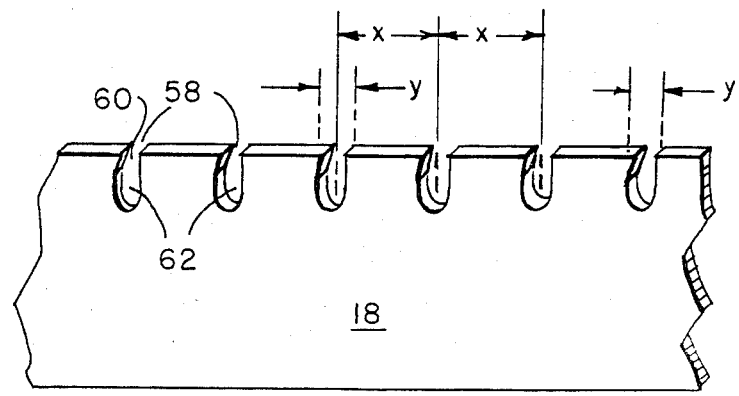
FIG. 7 is a partial side view of the slot configurations in a channel member of an alternative embodiment.

FIG. 7 shows a segment of a side wall 18 having a plurality of open slots 58 (having an equidistant center-to-center spacing x) of an alternative configuration formed along its unjoined edge. Each slot 58 has an upper, entry region 60 characterized by a narrower width than a lower, blind retaining region 62 which has a width y which may be smaller than (or, alternatively, approximately equal to) the diameter of central portion 50 of sleeve 46, 46'. The narrower width of the entry region is formed by having the upper, opposite edges of the slot extended slightly together. This configuration, in which the width of entry region 60 is smaller than width y, provides deformation of the central portion 50 of sleeves 46, 46' during their insertion; however, as the central portions 50 are forced beyond entry regions 60 and into retaining regions 62, central portions 50 are free to resume their undeformed rest dimensions but restricted, by the narrowness of entry regions 60, from working upwardly out of slots 58. This feature contributes to an assurance that sleeves 46, 46' will not work loose and escape from slots 58 during either shipment of conveyor section 10 or subsequent cargo conveying operations.

There are two options available for forming entry regions 60; in the first option, a slot 58 may be pre-punched as shown in FIG. 7 to provide a narrow throat or entry region 60. In the second option, side member 18 may be formed with slots 22 as shown in FIGS. 1 through 5, with parallel walls. Then, after assembly of a conveyor section with the axles positioned in the slots, a narrow throat may be formed at entry regions, or throats, 60 of each slot by a punch operation in which entry regions 60 are deformed inwardly with the opposite entry edges of the slots extended slightly together as shown in FIG. 7.

Figure 8:
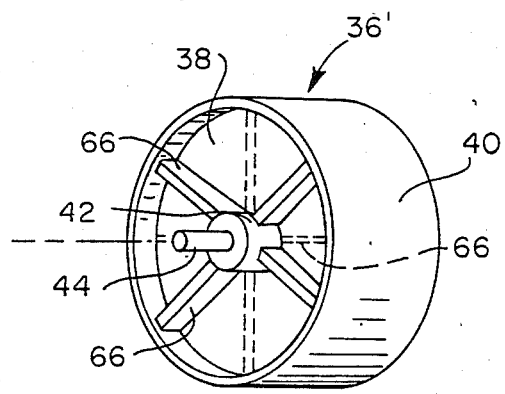
FIG. 8 is an isometric view of an alternative embodiment of a roller.

FIG. 8 shows an alternative roller 36' which may be molded from an inexpensive material such as nylon, but which is designed to handle greater cargo masses. In this embodiment, a plurality of webs 66 are molded on both sides of central disc 38, and extend radially between hub 42 and the inner surfaces of flange 40. It may be noted that the webs on one side of disc 38 are arcuately shifted and thereby positioned between the webs on the opposite side of disc 38. Webs 66 serve to strengthen circumferential flange 40.

FIG. 9 provides a cross-sectional end view to show the detailed structural aspects of an alternative embodiment of a section 10' of the multi-track undriven gravity-type conveyor. In this embodiment, channels 12' are formed as integral parts of base structure 16' as, for example, by extrusion of a material such as aluminum. An equal separation, d exists between neighboring side walls 18 defining each channel 12'. A plurality of open slots 22 are subsequently formed along the unjoined upper edges of each side wall 18 by machining or punching operations. The slots 22 are substantially identical and equidistantly spaced along the upper or unjoined edges of side walls 18. Slots 22 are aligned in parallel columns which are substantially perpendicular to the length of multi-track section 10. Connecting side 20' joins flange walls 24 and forms the central portion of the structure 16' extending between and interconnecting side walls 18.

FIG. 10 shows a section 10" of the multi-track undriven gravity-type conveyor embodying several of the principles disclosed herein. In this embodiment, a plurality of channel members 12 of any desired length are attached, in a spaced apart, parallel relation to the outer surface of a web 14 of base structure 16. Each channel member 12 has a pair of opposite side walls 18 extending in parallel relation along the length of section 10" with intermediate webs 20 rigidly joining and maintaining each pair of side walls 18 in fixed, spaced apart relation. Connecting sides 20 of each channel member 12 is attached to the outer surface of web 14. The feet 26 of flange walls 16 are inwardly directed to provide a base occupying minimal lateral space.

Sections 10' in FIGS. 9 and 10" in FIG. 10 are formed with equidistant spacing between slots 22 along the length of side walls 18. The end portions of axles 30 along any row of rollers 28 are disposed within slots 22 in configurations adopted to particular load-bearing requirements. For example, and as was shown in FIG. 2, the end portions of axles 30 in a row of rollers 28 may be disposed within every third slot along the length of the row. The center-to-center spacing between successive open slots 22 along each side wall 18 can be made extremely small. In a typical embodiment, the center-to-center spacing between successive slots 22 is substantially less than one-half of the exterior diameter of a roller 28. Such spacing allows the end portions of axles 30 in a row of rollers 28 to be disposed within every third slot 22 along the length of a row, whereby the disposition of rollers 28 in the left, center and right rows shown in FIGS. 9 and 10 provides a staggered alignment of axles 30 between neighboring rows.

In an alternative to the embodiment shown in FIG. 10, the spacing between successive slots along each channel member may be arranged to equal the sum of the exterior diameter of a roller 28 and a small clearance value. The staggered configuration of rollers 28 can be achieved simply by incrementally shifting the channel members longitudinally relative to each other.

A plurality of open slots 22 are formed along the unjoined edges of each side wall 18. Slots 22 are substantially identical and equidistantly spaced along the upper or unjoined edges of side walls 18, and are aligned in parallel columns which are substantially perpendicular to the length of multi-track section 10.

FIG. 11 shows an embodiment incorporating another feature of the present invention—close lateral spacing which is attainable simply by incorporating rollers 28 having very wide circumferential load carrying surface. This feature, when combined with the exceptionally close longitudinal spacing attainable between successive rollers in the conveyor disclosed, offers an enhanced ability to carry exceptionally heavy cargo.

Figure 12:
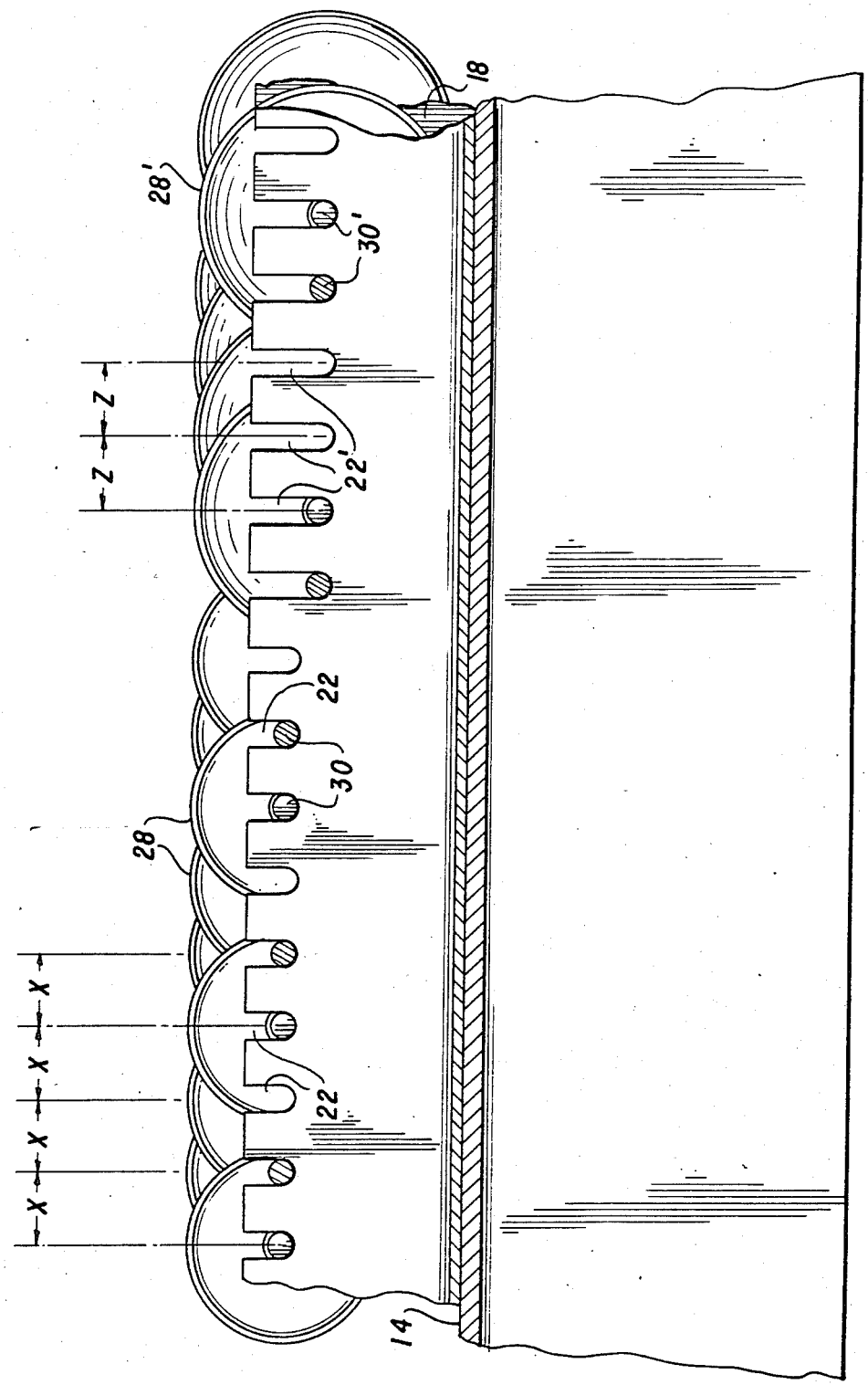
FIG. 12 is a side cross-sectional view of an alternate embodiment of a conveyor.

As shown in FIG. 12, other embodiments may be constructed with channel elements 18 containing variations in either the depths of slots 22, 22', the widths of the slots, or the spacings between successive slots, either separately or in combination, along the length of each channel member. In the embodiment shown in FIG. 12 for example, three channel members 18 provide for five rows of staggered rollers 28, 28'. Slots 22' along the rightmost portions of channels 18 shown have substantially greater depth than the depth of slots 22 shown along the leftmost portions. The greater depth of slots 22' enables reception of rollers 28' having a greater exterior diameter than rollers 28 while preserving a common horizontal load line for supporting cargo along a tangent extending between lesser diameter rollers 28 and greater diameter rollers 28'. Also, the longitudinal spacing, z, between successive slots 22' may be made shorter than spacing, x, between successive slots 22, to assure a minimal longitudinal gap between rollers 28' along the rightmost portion. Alternatively, slots may be made either less deep or spaced farther apart to receive other sizes or configurations of rollers. Also, the widths of some slots may be made different to receive axles 30 of different diameters. With these variations, the conveyors disclosed may be configured with two or more types or sizes of rollers to accommodate peculiar cargo handling requirements.

It is apparent from the foregoing details that the present invention contemplates a multi-track conveyor for movement and live storage of cargo. Through its closer wheel spacing, this conveyor provides increased load carrying capacity while enabling gravity flow of cargo having narrow load-bearing surfaces. Examples of the types of cargo which may flow over a conveyor constructed according to the principles disclosed herein include pallets with very narrow slats and even pails and drums with bottom chines.

The economy of rail design, for example, two channel members supporting three rows of rollers, minimizes the number of structural components required while alleviating difficulties during fabrication in the alignment of the channel members used. The roller spacing patterns of the resulting conveyor are easy to change, even in the field and without tools. The inexpensive roller disclosed, with its sleeve bushing type bearing, matches the low friction properties of a much more expensive ball bearing type roller. Moreover, the conveyor disclosed is amenable to interchanging or mixing of rollers of different characteristics. For example, steel skate wheel type rollers or heavy-duty economy rollers may be placed at conveyor zones subjected to impact loads such as loading zones where pallets are often dropped onto a conveyor. Standard economy wheels may be used in the same conveyor system at locations intermediate the loading and unloading zones.

I claim:

1. An undriven gravity roller conveyor, comprising:
   a plurality of rollers mounted on axles, with each of said rollers being mounted on a different one of said axles;
   a section providing a base and a plurality of discrete elongate channel members extending from said base in a laterally spaced apart, parallel relation forming a plurality of rows, each of said channel members having integral therewith a plurality of opposite side walls extending along the length of said rows and a connecting side rigidly joining and maintaining said opposite side walls in a fixed spaced apart relation with the separation between said opposite side walls being equal to the separation between neighboring channel members;
   said plurality of opposite side walls in each of said channel members having a plurality of slots formed therein alignable in parallel columns with the corresponding slots in at least the closest of the opposite side walls of a neighboring channel member, said parallel columns being substantially perpendicular to the length of said rows, said slots being open substantially identical and equidistantly spaced on both sides and along an unjoined edge of each of said opposite side walls in each of said channel members, the spacing between successive slots along said unjoined edge of each side wall being less than the exterior diameter of said rollers within said section; and said axles being disposable within said slots, both between said plurality of opposite side walls in each of said channel members and between adjacent side walls of neighboring pairs of said channel members with the axles of rollers in any two neighboring rows being disposable in different ones of said columns, whereby the separation between axles of rollers in said any two neighboring rows may be less than one-half of the exterior diameter of said rollers.

2. The conveyor of claim 1, wherein said plurality of rollers are disposed between adjacent pairs of said side walls, whereby n discrete channel members provide 2n−1 rows of said rollers.

3. The conveyor of claim 2, wherein the spacing between successive slots along said unjoined edge of each side wall is less than one-half of the exterior diameter of said rollers.

4. The conveyor of claim 2, wherein the spacing between successive slots along said unjoined edge of each side wall is substantially equal to the quotient of the sum of the exterior diameter of one of said rollers and the clearance between two successive rollers in a row divided by the number of said rows.

5. The conveyor of claim 2, wherein said base has a plurality of substantially parallel flange walls extending along the length of said rows, said flange walls being connected together by an intermediate member disposed between said flange walls, said channel members being attached by said connecting sides to said intermediate member, said side walls extending away from said connecting sides in a direction opposite to the disposition of said opposite side walls of said channel members.

6. The conveyor of claim 1, wherein the spacing between successive slots along said unjoined edge of each side wall is less than one-half of the exterior diameter of said rollers.

7. The conveyor of claim 6, wherein the spacing between successive slots along said unjoined edge of each side wall is substantially equal to the quotient of the sum of the exterior diameter of one of said rollers and the clearance between two successive rollers in a row divided by the number of said rows.

8. The conveyor of claim 1, wherein said base has a plurality of substantially parallel flange walls extending along the length of said rows, said flange walls being connected together by an intermediate member disposed between said flange walls, said channel members being attached by said connecting sides to said intermediate member, said side walls extending away from said connecting sides in a direction opposite to the disposition of said opposite side walls of said channel members.

9. The conveyor of claim 1, wherein a plurality of said rollers each comprise:
an element providing a circumferential load-carrying surface;
an axle;
means for retaining said axle disposed coaxially with respect to said load-carrying surface at the center of the roller; and
means for connecting said retaining means to said element.

10. The conveyor of claim 9, wherein said element comprises an elastomeric material providing said load-carrying surface.

11. The conveyor of claim 9, wherein the spacing between successive slots along said unjoined edge of each side wall is less than one-half of the exterior diameter of said rollers.

12. The conveyor of claim 9, wherein said plurality of rollers have a plurality of webs disposed on said central disc extending radially between said hub and said circumferential flange.

13. The conveyor of claim 12, wherein the webs are disposed on both sides of said disc and the webs disposed on one side of said disc are positioned between the webs disposed on the opposite side of said disc.

14. The conveyor of claim 1, wherein a plurality of said rollers each comprise:
a central disc;
a circumferential flange encircling said disc and forming a load-carrying surface;
a hub formed at the center of said disc integrally with said disc and flange;
each of said axles having opposite ends extending from and axially beyond said hub; and
a plurality of sleeves insertable within said slots, said sleeves having axial bores disposed around both of said ends and accommodating rotation of said axles.

15. The conveyor of claim 14, wherein each sleeve has a central circumferential portion with a first exterior cross-sectional dimension, and a flange forming one terminus of said central circumferential portion having a second and greater cross-sectional dimension, said central circumferential portion being receivable within said slots and said flange being positionable between said hub and one of said side walls.

16. The conveyor of claim 15, wherein said first cross-sectional dimension is greater than the width of said slots, whereby said central circumferential portions are deformed when forced into said slots.

17. The conveyor of claim 16, wherein the cross-sectional dimension of said axial bores is greater than the diameter of said axles.

18. The conveyor of claim 15, wherein said slots have an entry region adjoining the edges of said opposite side walls with a width less than said first cross-sectional dimension and a retaining region having a width approximately equal to said first cross-sectional dimension, whereby said entry region prevents said sleeves from being inadvertently released from said retaining region.

19. The conveyor of claim 14, wherein said sleeves have a central circumferential portion with a first exterior cross-sectional dimension, and said slots have an entry region adjoining the edges of said opposite side walls with a width less than said first cross-sectional dimension and a retaining region having a width approximately equal to said first cross-sectional dimension, whereby said entry region prevents said sleeves from being inadvertently released from said retaining region.

20. The conveyor of claim 1, wherein said rollers are disposed both between said plurality of opposite side walls in each of said channel members and between adjacent side walls of neighboring pairs of said channel members.

21. The conveyor of claim 20, wherein a plurality of said rollers each comprise:
a central disc;
a circumferential flange encircling said disc and forming a load-carrying surface;
a hub formed at the center of said disc integrally with said disc and flange;
each of said axles having opposite ends extending from and axially beyond said hub; and
a plurality of sleeves insertable within said slots, said sleeves having axial bores disposed around both of said ends and accommodating rotation of said axles.

22. The conveyor of claim 21, wherein said sleeves each have a central circumferential portion with a first exterior cross-sectional dimension, and a flange forming one terminus of said central circumferential portion having a second and greater cross-sectional dimension, said central circumferential portion being receivable within said slots.

23. The conveyor of claim 22, wherein said first cross-sectional dimension is greater than the width of said slots, whereby said central circumferential portions are deformed when forced into said slots.

24. The conveyor of claim 23, wherein the cross-sectional dimension of said axial bores is greater than the diameter of said axle.

25. The conveyor of claim 21, wherein said sleeves have a central circumferential position with a first exterior cross-sectional dimension, and said slots have an entry region adjoining the edges of said opposite side walls with a width less than said first cross-sectional dimension and a retaining region having width approximately equal to said first cross-sectional dimension, whereby said entry region prevents said sleeves from being inadvertently releasd from said retaining region.

26. An undriven gravity roller conveyor, comprising:
a plurality of rollers mounted on axles;
a section providing a base and a plurality of discrete elongate channel members extending from said base in a laterally spaced apart, parallel relation forming a plurality of rows, each of said channel members having interal therewith a plurality of opposite side walls extending along the length of said rows and a connecting side rigidly joining and maintaining said opposite side walls in a fixed spaced apart relation with the separation between said opposite side walls being equal to the separation between neighboring channel members;
said plurality of opposite side walls in each of said channel members having a plurality of slots formed therein aligned in parallel columns with the corresponding slots in at least the closest of the opposite side walls of a neighboring channel member, said parallel columns being substantially perpendicular to the length of said rows, said slots being equidistantly spaced along an unjoined edge of each of said opposite side walls in each of said channel members, the spacing between successive slots along said unjoined edge of each side wall being less than the exterior diameter of said rollers within said section;; and
said axles being disposable within said slots, wherein said rollers are disposed both between said plurality of opposite side walls in each of said channel members and between adjacent side walls of neighboring pairs of said channel members.

27. The conveyor of claim 26, wherein the spacing between successive slots along said unjoined edge of each side wall is less than one-half of the exterior diameter of said rollers.

28. The conveyor of claim 26, wherein the spacing between successive slots along said unjoined edge of each side wall is substantially equal to the quotient of the sum of the exterior diameter of one of said rollers and the clearance between two successive rollers in a row divided by the numnber of said rows.

29. The conveyor of claim 26, wherein said base has a plurality of substantially parallel flange walls extending along the length of said rows, said flange walls being connected together by an intermediate member disposed between said flange walls, said channel members being attached by said connecting sides to said intermediate members, said side walls extending away from said connecting sides in a direction opposite to the disposition of said opposite side walls of said channel members.

30. The conveyor of claim 26, wherein a plurality of said rollers each comprise:
an element providing a circumferential load-carrying surface;
an axle;
means for retaining said axle disposed coaxially with respect to said load-carrying surface at the center of the roller; and
means for connecting said retaining means to said element.

31. The conveyor of claim 30, wherein said element comprises an elastomeric material providing said load-carrying surface.

32. The conveyor of claim 31, werein the spacing between successive slots along said unjoined edges of each side wall is less than one-half of the exterior diameter of said rollers.

33. The conveyor of claim 26, wherein a plurality of said rollers each comprise:
a central disc;
a circumferential flange encircling said disc and forming a load-carrying surface;
a hub formed at the center of said disc integrally with said disc and flange;
each of said axles having opposite ends extending from and axially beyond said hub; and
a plurality of sleeves insertable within said slots, said sleeves having axial bores disposed around both of said ends and accommodating rotation of said axles.

34. The conveyor of claim 33, wherein each sleeve has a central circumferential portion with a first exterior cross-sectional dimension, and a flange forming one terminus of said central circumferential portion having a second and greater cross-sectional dimension, said central circumferential portion being receivable within said slots.

35. The conveyor of claim 34, wherein said first cross-sectional dimension is greater than the width of said slots, whereby said central circumferential portions are deformed when forced into said slots.

36. The conveyor of claim 35, wherein the cross-sectional dimension of said axial bores is greater than the diameter of said axles.

37. An undriven gravity roller conveyor, comprising:
a base;
a plurality of rollers mounted on axles;

a plurality of n discrete elongate channel members attached to said base in a laterally spaced apart, parallel relation forming 2n−1 rows, each of said channel members having intregral therewith a plurality of opposite side walls extending along the length of said rows and a connecting side rigidly joining and maintaining said opposite side walls in a fixed spaced apart relation with the separation between said opposite side walls being equal to the separation between neighboring channel members;

said plurality of opposite side walls in each of said channel members having a plurality of slots formed therein aligned in parallel columns with the corresponding slots formed in at least the closest of the opposite side walls of a neighboring channel member, said parallel columns being substantially perpendicular to the length of said rows, said slots being open, substantially identical and equidistantly spaced apart by less than one-half the exterior diameter of said rollers along an unjoined edge of each of said opposite walls in each of said channel members; and said axles being disposable within said slots both between said plurality of opposite side walls in each of said channel members and between adjacent walls of neighboring pairs of said channel members.

38. The conveyor of claim 37, wherein the spacing between successive slots along said unjoined edge of each side wall is substantially equal to the quotient of the sum of the exterior diameter of one of said rollers and the clearance between two successive rollers in a row divided by n.

39. The conveyor of claim 38, wherein said base has a plurality of substantially parallel flange walls extending along the length of said rows, said flange walls being connected together by an intermediate member disposed between said flange walls, said channel members being attached by said connecting sides to said intermediate member, said side walls extending away from said connecting sides in a direction opposite to the disposition of said opposite walls of said channel members.

40. The conveyor of claim 37, wherein a plurality of said rollers each comprise:
a central disc;
a circumferential flange encircling said disc and forming a load-carrying surface;
a hub formed at the center of said disc integrally with said disc and flange;
each of said axles having opposite ends extending from and axially beyond said hub; and
a plurality of sleeves insertable within said slots, said sleeves having axial bores disposed around both of said ends and accommodating rotation of said axles.

41. The conveyor of claim 40, wherein each sleeve has a central circumferential portion with a first exterior cross-sectional dimension, and a flange forming one terminus of said central circumferential portion having a second and greater cross-sectional dimension, said central circumferential portion being receivable within said slots.

42. The conveyor of claim 41, wherein said first cross-sectional dimension is greater than the width of said slots, whereby said central circumferential portions are deformed when forced into said slots.

43. The conveyor of claim 42, wherein the cross-sectional dimension of said axial bores is greater than the diameter of said axles.

44. The conveyor of claim 40, wherein said slots have an entry region adjoining the edges of said opposite side walls with a width less than said first cross-sectional dimension and a retaining region having a width approximately equal to said first cross-sectional dimension, whereby said entry region prevents said sleeves from being inadvertently released from said retaining region.

45. An undriven gravity roller conveyor, comprising:
a plurality of rollers mounted on axles, with each of said rollers being mounted on a different one of said axles;
a section providing a base and a plurality of elongate, spaced apart, parallel side walls defining a plurality of discrete parallel channels extending along the length of said section, said side walls being rigidly joined to said base with a fixed spaced apart relation existing between each pair of side walls defining said channels;
said plurality of side walls defining each of said channels having a plurality of slots formed therein alignable in parallel columns with the corresponding slots in at least the closest of the pair of side walls of a neighboring one of said channels, said parallel columns being substantially perpendicular to the length of said channels, said slots being open, substantially identical and equidistantly spaced, on both sides and along an unjoined edge of each of said side walls, the spacing between successive slots along said unjoined edge of each side wall being less than the exterior diameter of one of said rollers within said section and substantially equal to the quotient of the sum of the exterior diameter of one of said rollers and the clearance between two successive rollers in a channel divided by the number of said channels; and
said axles being disposable within said slots, both between said plurality of opposite side walls in each of said channel members and between adjacent side walls of neighboring pairs of said channel members with the axles of rollers in any two neighboring rows being disposed in different ones of said columns, whereby the separation between axles in any two neighboring rows may be less than one-half of the exterior diameter of said rollers.

46. The conveyor of claim 45, wherein the spacing between successive slots along said unjoined edge of each side wall is less than one-half of the exterior diameter of said rollers.

47. An undriven gravity roller conveyor, comprising:
a plurality of rollers mounted on axles, with each of said rollers being mounted on a different one of said axles;
a section providing a base and a plurality of discrete elongate channel members extenting from said base in a laterally spaced apart, parallel relation forming a plurality of rows, each of said channel members having integral therewith a plurality of opposite side walls extending along the length of said rows and a connecting side rigidly joining and maintaining said opposite side walls in a fixed spaced apart relation with the separation between said opposite side walls being equal to the separation between neighboring channel members;

said plurality of opposite side walls in each of said channel members having a plurality of slots formed therein being alignable to define parallel columns with the corresponding slots in at least the closest of the opposite side walls of a neighboring channel member, said parallel columns being substantially perpendicular to the length of said rows, said slots being spaced on both sides and along an unjoined edge of each of said opposite side walls in each of said channel members with the spacing between successive slots along an unjoined edge of each side wall being less than the exterior diameter of said rollers within said section; and said axles being disposable within said slots, both between said plurality of opposite side walls in each of said channel members and between adjacent side walls of neighboring pairs of said channel members, with the axles of rollers in any two neighboring rows being disposed in different ones of said columns, whereby the separation between axles in any two neighboring rows may be less than one-half of the exterior diameter of said rollers.

48. The conveyor of claim 47, wherein said plurality of rollers are disposed between adjacent pairs of said side walls, whereby n discrete channel members provide 2n−1 rows of said rollers.

49. The conveyor of claim 47, wherein the spacing between successive slots along said unjoined edge of each side wall is less than one-half of the exterior diameter of said rollers.

50. The conveyor of claim 47, wherein the spacing between successive slots along said unjoined edge of each side wall is substantially equal to the quotient of the sum of the exterior diameter of one of said rollers and the clearance between two successive rollers in a row divided by the number of said rows.

51. The conveyor of claim 47, wherein the depth of said slots along first portions of said channel members differs from the depth of said slots along other portions of said channel members.

52. The conveyor of claim 47, wherein said slots along first portions of said channel members exhibit an equidistant spacing between successive ones of said slots different from an equidistant spacing between successive ones of said slots along other portions of said channel members.

53. The conveyor of claim 47, wherein the width of said slots along first portions of said channel members differs from the width along other portions of said channel members.

54. The conveyor of claim 47, wherein said slots along first portions of said channel members exhibit a first equidistant spacing between successive ones of said slots and a first depth different from a second depth and a second equidistant spacing between successive ones of said slots along other portions of said channel members.

55. An undriven gravity roller conveyor, comprising:
a plurality of rollers mounted on axles, with each of said rollers being mounted on a different one of said axles;
a section providing a base and a plurality of discrete elongate channel members extending from said base in a laterally spaced apart, parallel relation forming a plurality of rows, each of said channel members having integral therewith a plurality of opposite side walls extending along the length of said rows and a connecting side rigidly joining and maintaining said opposite side walls in a fixed spaced apart relation with the separation between said opposite side walls being equal to the separation between neighboring channel members;
said plurality of opposite side walls in each of said channel members having a plurality of slot formed therein alignable in parallel columns with the corresponding slots in at least the closest of the opposite side walls of a neighboring channel member, said slots being on both sides and along an unjoined edge of each of said opposite side walls in each of said channel members with the spacing between successive slots along said unjoined edge of each side wall being less than one-half of the exterior diameter of said rollers; and
said axles being disposable within said slots, both between said plurality of opposite side walls in each of said channel members and between adjacent side walls of neighboring pairs of said channel members with the axles of rollers in any two neighboring rows being disposable in different ones of said columns.

56. The conveyor of claim 55, wherein said plurality of rollers are disposed between adjacent pairs of said side walls, whereby n discrete channel members provide 2n−1 rows of said rollers.

57. The conveyor of claim 55, wherein the spacing between successive slots along said unjoined edge of each side wall is substantially equal to the quotient of the sum of the exterior diameter of a corresponding one of said rollers and the clearance between two successive ones of corresponding rollers in a row divided by the number of said rows.

58. An undriven gravity roller conveyor, comprising:
a plurality of rollers mounted on axles;
a section providing a base and a plurality of channel members extending from said base in a laterally spaced apart, parallel relation forming a plurality of rows, each of said channel members having integral therewith a plurality of opposite side walls extending along the length of said rows and a connecting side rigidly joining and maintaining said opposite side walls in a fixed spaced apart relation with the separation between said opposite side walls being equal to the separation between neighboring channel members;
said plurality of opposite side walls in each of said channel members having a plurality of slots formed therein alignable in parallel columns with the corresponding slots in at least the closest of the opposite side walls of a neighboring channel member, said slots being spaced along an unjoined edge of each of said opposite side walls in each of said channel members with the spacing between successive slots along said unjoined edge of each side wall being less than one-half of the exterior diameter of said rollers; and
said axles beinhg disposable within said slots, wherein said rollers are disposed both between said plurality of opposite side walls in each of said channel members and between adjacent side walls of neighboring pairs of said channel members.

59. The conveyor of claim 58, wherein said plurality of rollers are disposed between adjacent pairs of said side walls, whereby n discrete channel members provide 2n−1 rows of said rollers.

60. The conveyor of claim 58, wherein the spacing between successive slogts along said unjoined edge of each side wall is substantially equal to the quotient of the sum of the exterior diameter of a corresponding one of said rollers and the clearance between two successive ones of corresponding rollers in a row divided by the number of said rows.

* * * * *